(12) United States Patent
Marchant et al.

(10) Patent No.: US 6,918,005 B1
(45) Date of Patent: Jul. 12, 2005

(54) METHOD AND APPARATUS FOR CACHING FREE MEMORY CELL POINTERS

(75) Inventors: Nils Marchant, Ocean Reef (AU);
Philip D. Cole, Redwood City, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 182 days.

(21) Appl. No.: 10/045,288

(22) Filed: Oct. 18, 2001

(51) Int. Cl.[7] .............................................. G06F 12/00
(52) U.S. Cl. ........................ 711/113; 711/3; 711/118; 711/156; 710/54; 710/56; 710/57
(58) Field of Search ................................ 711/113, 118, 711/219, 3, 154, 156; 710/52, 53, 54, 56, 57

(56) References Cited

U.S. PATENT DOCUMENTS

| | | | |
|---|---|---|---|
| 6,487,202 B1 * | 11/2002 | Klausmeier et al. ..... | 370/395.1 |
| 6,549,992 B1 * | 4/2003 | Armangau et al. ......... | 711/162 |
| 6,618,390 B1 * | 9/2003 | Erimli et al. ............... | 370/412 |
| 2002/0194436 A1 * | 12/2002 | McKenney ................. | 711/152 |

* cited by examiner

Primary Examiner—Mano Padmanabhan
Assistant Examiner—Jasmine Song
(74) Attorney, Agent, or Firm—Townsend and Townsend and Crew, LLP

(57) ABSTRACT

A method and apparatus are provided for caching free cell pointers pointing to memory buffers configured to store data traffic of network connections. In one example, the method stores free cell pointers into a pointer random access memory (RAM). At least one free cell pointer is temporarily stored into internal cache configured to assist in lowering a frequency of reads from and writes to the pointer RAM. A request is received from an external integrated circuit for free cell pointers. Free cell pointers are sent to queues of the external integrated circuit, wherein each free cell pointer in a queue is configured to become a write cell pointer. At least one write cell pointer and a corresponding cell descriptor is received from the external integrated circuit. Free cell pointer counter values are then calculated in order to keep track of the free cell pointers.

40 Claims, 4 Drawing Sheets

METHOD AND APPARATUS FOR CACHING FREE MEMORY CELL POINTERS

The present application is related to U.S. patent application Ser. No. 10/045,187, entitled "METHOD AND APPARATUS FOR RANDOM EARLY DETECTION OF DATA PACKETS OF NETWORK CONNECTIONS", filed Oct. 18, 2001; and is also related to U.S. patent application Ser. No. 10/045,290, entitled "METHOD AND APPARATUS FOR INSERTING EMPTY MEMORY CELLS INTO A DATA FLOW OF NETWORK CONNECTIONS OF A COMPUTER NETWORK", filed Oct. 18, 2001; and is also related to U.S. patent application Ser. No. 10/035,791, entitled "METHOD AND APPARATUS FOR DISCARDING A PRIORITIZED FAIR SHARE OF TRAFFIC OF NETWORK CONNECTIONS", filed Oct. 18, 2001; the disclosures of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to quality of service on computer networks, such as the Internet. The present invention more particularly relates to managing bandwidth available amongst a set of network connections in order to improve quality of service of a computer network.

2. Discussion of Background

It is hard to dismiss the entrepreneurial nature of the Internet; this is no longer a research project. For most organizations connected to the global Internet, the Internet is a full-fledged business interest. Having said that, it is equally hard to dismiss the poor service quality that is frequently experienced. The rapid growth of the Internet, and increasing levels of traffic, make it difficult for Internet users to enjoy consistent and predictable end-to-end levels of service quality.

The Internet has historically offered a single level of service, that of "best-effort," where all data packets are treated with equity in the network. However, we are finding that the Internet itself does not offer a single level of service quality, and some areas of the network exhibit high levels of congestion and consequently poor quality, while other areas display consistent levels of high quality service. Customers are now voicing a requirement to define a consistent service quality they wish to be provided, and network service providers are seeking ways in which to implement such a requirement. This effort is happening within the umbrella called "Quality of Service" (QoS). Examples of factors that affect QoS on the Internet include delay, bandwidth, and reliability.

Delay is the elapsed time for a packet to be passed from the sender, through the network, to the receiver. The higher the delay, the greater the stress that is placed on the transport protocol to operate efficiently. For Transfer Control Protocol (TCP), higher levels of delay imply greater amounts of data held "in transit" in the network, which in turn places stress on the counters and timers associated with the protocol. It should also be noted that TCP is a "self-clocking" protocol, where the sender's transmission rate is dynamically adjusted to the flow of signal information coming back from the receiver, via the reverse direction acknowledgments (ACK's), which notify the sender of successful reception. The greater the delay between sender and receiver, the more insensitive the feedback loop becomes, and therefore the protocol becomes more insensitive to short term dynamic changes in network load. For interactive voice and video applications, the introduction of delay causes the system to appear unresponsive.

Bandwidth is the maximal data transfer rate that can be sustained between two end points. It should be noted that this is limited not only by the physical infrastructure of the traffic path within the transit networks, which provides an upper bound to available bandwidth, but is also limited by the number of other flows which share common components of this selected end-to-end path.

Reliability is commonly considered a property of the transmission system, and in this context, it can be thought of as the average error rate of the medium. Reliability can also be a byproduct of the switching system. A poorly configured or poorly performing switching system can alter the order of packets in transit, delivering packets to the receiver in a different order than that of the original transmission by the sender, or even dropping packets through transient routing loops.

The Internet is composed of a collection of routers and transmission links. Routers receive an incoming packet, determine the next hop interface, and place the packet on the output queue for the selected interface. Transmission links have characteristics of delay, bandwidth and reliability. Poor service quality is typically encountered when the level of traffic selecting a particular hop exceeds the transmission bandwidth of the hop for an extended period time. In such cases, the router's output queues associated with the saturated transmission hop begin to fill, causing additional transit delay, until the point is reached where the queue is filled, and the router is then forced to discard packets or at least portions of packets (reduced reliability). This in turn forces adaptive flows to reduce their sending rate to minimize congestion loss, reducing the available bandwidth for the application.

Unfortunately, present methods of managing bandwidth that is available amongst a set of network connections have been inadequate, given the increasingly demanding transmission needs of users of the Internet.

SUMMARY OF THE INVENTION

It has been recognized that what is needed is a technique for managing bandwidth available amongst a set of network connections. Specifically, what is needed is a technique for managing pointers pointing to memory buffers that are available for storing data traffic. Broadly speaking, the present invention fills these needs by providing a method and apparatus for caching pointers pointing to free memory cell buffers configured to store data traffic of network connections. It should be appreciated that the present invention can be implemented in numerous ways, including as a process, an apparatus, a system, a device or a method. Several inventive embodiments of the present invention are described below.

In one embodiment, a method is provided for caching free cell pointers pointing to free memory buffers configured to store data traffic of network connections. The method comprises the following: storing free cell pointers into a pointer random access memory (RAM), wherein each free cell pointer points to a memory buffer that is vacant and available for storing data traffic; temporarily storing at least one free cell pointer into internal cache configured to assist in lowering a frequency of reads from and writes to the pointer RAM; receiving a request from an external integrated circuit for free cell pointers; sending free cell pointers to queues of the external integrated circuit, wherein each free cell pointer in a queue is configured to become a write cell pointer; receiving at least one write cell pointer and a corresponding cell descriptor from the external integrated circuit; and calculating free counter values in order to keep track of the free cell pointers.

In another embodiment, an integrated circuit configured to cache free cell pointers pointing to free memory buffers configured to store data traffic of network connections is provided. The integrated circuit comprises controller circuitry configured to control operations of: storing free cell pointers into a free pointer random access memory (RAM), wherein each free cell pointer points to a memory buffer that is vacant and available for storing data traffic; temporarily storing at least one free cell pointer into internal cache configured to assist in lowering a frequency of reads from and writes to the pointer RAM; receiving a request from an external integrated circuit for free cell pointers; sending free cell pointers to queues of the external integrated circuit, wherein each free cell pointer in a queue is configured to become a write cell pointer; receiving at least one write cell pointer and a corresponding cell descriptor from the external integrated circuit; and calculating free counter values in order to keep track of the free cell pointers.

Advantageously, the present invention demonstrates that high quality of service (QoS) is possible in the Internet, even with increasingly demanding transmission requirements. The present invention makes it possible to deliver best effort traffic in a manner which is predictable and fairly consistent. For example, the present invention deals with the problem of having bandwidth limitations when communicating with random access memory (RAM) of a router.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method and apparatus for caching free cell pointers pointing to memory buffers configured to store data traffic of network connections. Numerous specific details are set forth in order to provide a thorough understanding of the present invention. It will be understood, however, to one skilled in the art, that the present invention may be practiced without some or all of these specific details.

The list below provides a quick reference to acronyms used in this disclosure.

BERT—Built-in External Ram Test.
BNF—Cell Buffer Nearly Full.
CAC—Connection Admission Control—Network Management system level process which controls usage of bandwidth by connections.
CB—Circular Buffer.
CBR—Continuous Bit Rate.
CD—CellDescriptor—the collection of fields used by the Cell Control Path to identify one cell.
CDByp—CD which traverses the FSS Bypass block to bypass the remainder of the Cell Control Path.
CDDisc—CD processed by Discard block.
CDexEB—CD received by FSS from Egress Backplane Interface Subsystem.
CDexQSS—CD received by FSS from QSS.
CDLoop—CD looped back from MC Copy circuit to MC lists.
CDMC—CD of MC replicated cell which contains a dummy Cell pointer.
CDtoEB—CD from FSS to Egress Processor subsystem.
CDtoQSS—CD from FSS to QSS.
CellPtr—Cell pointer—address of cell in the Cell Buffer.
CID—ConnectionID—the 16 bit identifier which binds a cell to a connection between an incoming VPI/VCI and an outgoing VPI/VCI.
CIDCount—per-CID cell buffer occupancy.
CLP—Cell Loss Priority—ATM Cell Header field in which cell is 'tagged'.
CPU—Central Processing Unit—Management Processor which monitors and controls the SIF board and provides the interface to the network management.
EBISS—Egress Backplane Interface Subsystem.
EvenFree—number of free even Cell pointers.
Exp—Exponent part of exponential form.
FSS—Filter Subsystem.
Int—Interrupt.
Mant—Mantissa part of exponential form.
MC—Multicast—single bit field in CD which indicates that replication is required.
MC CB—Multicast Circular Buffer.
MCC—single bit field in CD which indicates that the CD is a
MC copy and as such contains a 'dummy' Cell pointer.
MCID—CID of looped back MC CD.
MR—Multicast (external) RAM.
MTS—Main Timing Sequence—fixed length sequence of ASIC clock cycles.
NRT—Non Real Time—traffic class which is not sensitive to cell delay or cell delay variation.
OAM—Operations Administration and Maintenance (cell).
Occ—Per-QueueID cell buffer occupancy.
OddFree—number of free odd Cell pointers.
OrigPtr—Original Cell pointer—The source MC CD from which copies are made.
PR—Pointer (external) RAM.
QoS—Quality of Service.
QSS—Queue Subsystem.
RdPtr—Read Pointer which obtains information from head of free list or circular buffer.

rt-VBR—real time VBR.
VBR—Variable Bit Rate.
WrPtr—Write Pointer which appends information to a linked list or circular buffer.

General Overview

Figure 1:
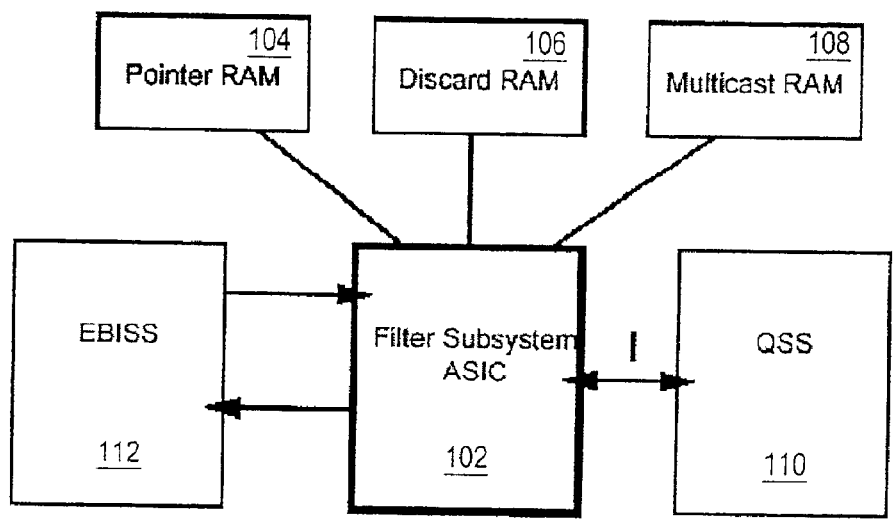
FIG. 1 shows the environment in which the Filter Subsystem (FSS) ASIC operates, in accordance with one embodiment of the present invention.

FIG. 1 shows the environment in which the Filter Subsystem (FSS) ASIC 102 operates, in accordance with one embodiment of the present invention. The FSS 102 includes controller circuitry configured to control operations of the management of memory buffers. The FSS 102 is in electrical communication with a pointer RAM 104, a discard RAM 106, a multicast RAM 108, a queue subsystem (QSS) 110, and an egress backplane interface subsystem (EBISS) ASIC 112.

High-Level Description of the Filter Subsystem (FSS)

The Filter Subsystem (FSS) 102 manages the Cell Buffer, performs multicasting, generates empty cell timeslots for Operations Administration and Maintenance (CAM) cells and Available Bit Rate (ABR) Virtual Source (VS) forward resource management (f-RM) cells, and supports ABR explicit rate (ER) functions. The FSS 102 consists of six functional blocks—Free List 114; Multicast 116; Discard 110; Cell Slot Generator 106; Pointer Remapping 112; and Bypass 108.

Figure 2:
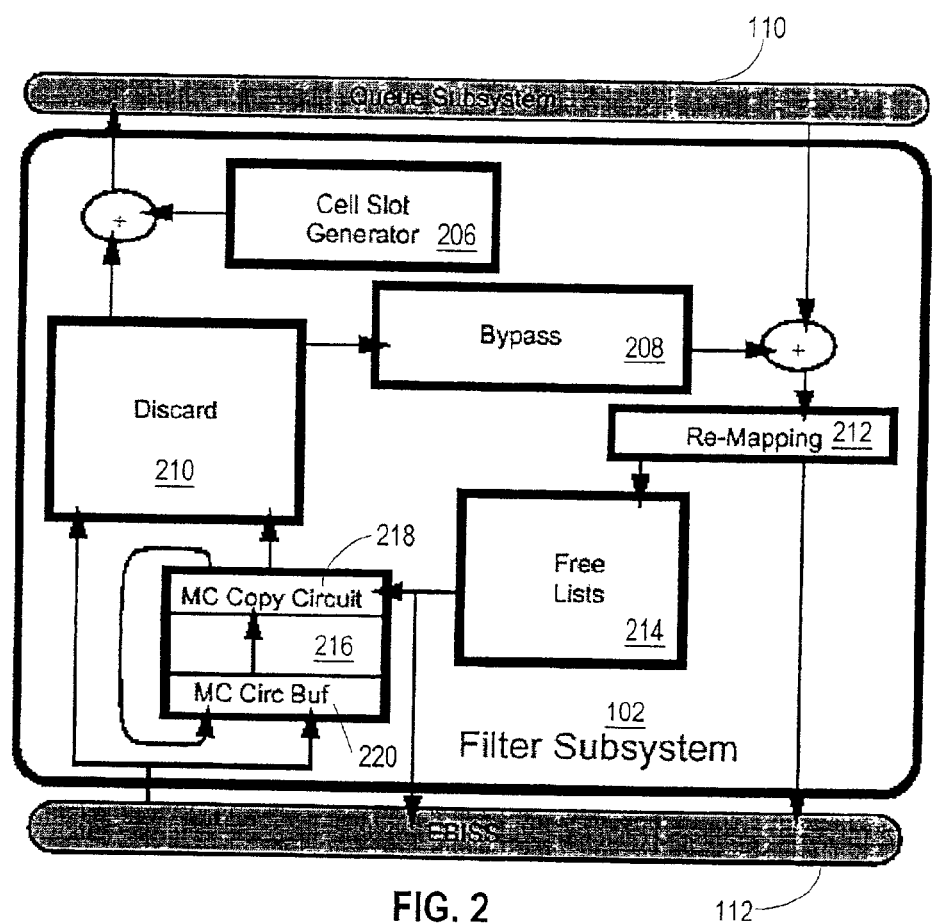
FIG. 2 is a high-level view of the FSS, in accordance with one embodiment of the present invention.

FIG. 2 is a high-level view of the FSS 102, in accordance with one embodiment of the present invention. User Data traffic flows from the Egress Backplane Interface Subsystem (EBISS) 112 through the Discard block 210 to the remainder of the Cell Control Path (Queue and Schedule Subsystems 110) and again through the FSS 102 to the EBISS 112.

Some of that traffic is removed from the stream in the Discard block 210. Some traffic bypasses the remainder of the ell Control Path via the Bypass block 208. ABR and OAM cells generated by the Cell Slot Generator 206 flow through the remainder of the Cell Control Path, again through the FSS to the Egress Processor.

The free list block 214 manages cell pointers, which point to cell storage locations within the Cell Buffer. Free cell pointers are stored in two circular buffers. One cell pointer is removed from the head of one circular buffer for each incoming cell. Each cell pointer is returned to the free list when the cell is discarded or after the cell departs from the Cell Buffer. In one embodiment, 256K cell pointers are provided, upgradable to 1M. The pointer RAM is partitioned into two equal spaces—the free list space and the remapping space. The free list space stores up to 256K (upgradable to 1M) free cell pointers. The remapping space maps multicast dummy cell pointers to original cell pointers. The remapping space is the same size as the free list space. The pointer RAM is 512K*24 bit (upgradable to 2M*24 bit).

The multicast block 216 generates copies of cells by generating multiple cell descriptors (CDs) whose dummy cell pointers point to the original cell pointer and cell in the Cell Buffer. The receipt of one original cell on one incoming connection may cause the transmission of multiple copies onto a set of outgoing connections. Each incoming MC cell is appended to the tail of an MC circular buffer 220. The MC copy circuit 218 serves the head of the MC circular buffer 220 to generate copies which may be transmitted or looped back to create further copies. The MC circular buffers 220 are prioritized so that higher priority MC cells are served before lower priorities.

The Discard block 210, which is an important aspect of the present invention, manages usage of the Cell Buffer by selectively discarding cells as they arrive. The Discard block monitors the buffer fill for each QueueID and for each CID within each QueueID. Higher priority QueueIDs (from priority 0) are offered more extensive use of the buffer at the expense of lower priorities. The Discard block 210 reaches discard decisions by comparing buffer fill for any CID with preconfigured thresholds for each cell loss priority (CLP).

The cell slot generator 206 generates and inserts cell placeholders into which cells may be inserted by the Egress Processor Subsystem (EPSS). ABR Virtual Source (VS) f-RM slots are inserted at regular cell spacings into ABR VS connections to support ABR flow control. The Cell Slot Generator also inserts OAM and other cells at the request of the EPSS via switch interface wire (SIFwire).

The Bypass block 208 provides two channels which bypass the remainder of the Cell Control Path. One channel is provided for SAR cells whose destination is the local CPU; the other is for ABR VD f-RM cells (not to be confused with VS f-RM cells) which are received from an upstream virtual source. Neither of those streams requires shaping.

The Remapping block 212 remaps MC dummy cell pointers to original cell pointers, returns cell pointers to the free list circular buffers, and maintains cell counters used by the Discard block 210. Mappings of dummy cell pointers to original cell pointers are held in the Remap partition of the Pointer RAM.

Free Lists

The Free List block 214 obtains and recycles Cell pointers, each of which is used to address one cell location in the Cell-Buffer. In response to requests from the EBISS 112, up to twelve Cell pointers per MTS are passed to the EBISS 112 where they are stored in FIFOs until required. The EBISS 112 returns the Cell pointers to the FSS 102 with CDs when cells arrive. Cell pointers are returned to a Free List after a cell has been discarded or transmitted from the Cell Buffer. The Free List block 214 provides a maximum of 16 Cell pointers each MTS to the EBISS 112 being 12 per MTS for writing incoming cells with 4 per MTS for reading outgoing cells.

General Operation and Interaction with the EBISS

The Cell pointers are stored in the Free List RAM 214. 256K Cell pointers are supported with 4 Mbit RAMS, upgradable to 1M with 16 Mbit RAMS. The circuit is implemented using RAM rather than FIFOs due to its higher density and for uniformity of testing. During initialization, the Built-in External Ram Test (BERT) RAM Tester writes all Cell pointers into the RAM. The Cell pointer values are consecutive 18 bit (256K) or 20 bit (1M) integer address values commencing at zero. The zero value is the NULL Cell pointer: the corresponding Cell Buffer location is not used. The Free List RAM 214 is addressed by Cell-Pointer. The contents of each address contains the next Cell pointer in the list.

Figure 3:
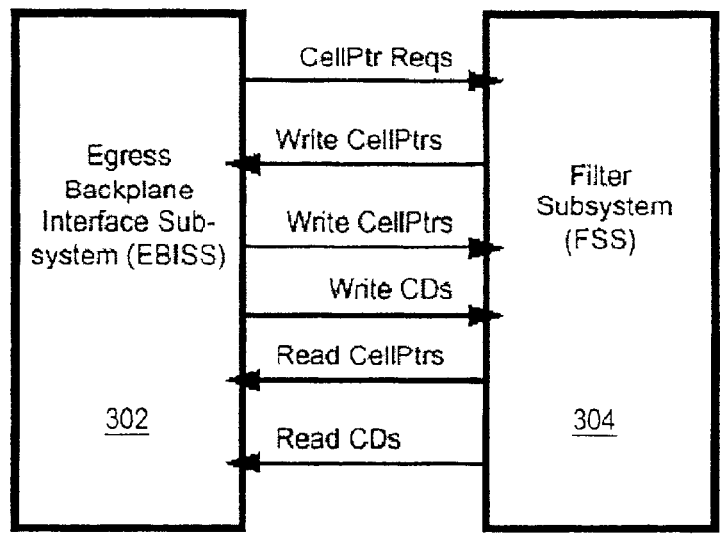
FIG. 3 illustrates cell buffer management, in accordance with one embodiment of the present invention.

FIG. 3 illustrates cell buffer management, in accordance with one embodiment of the present invention.

Figure 4:
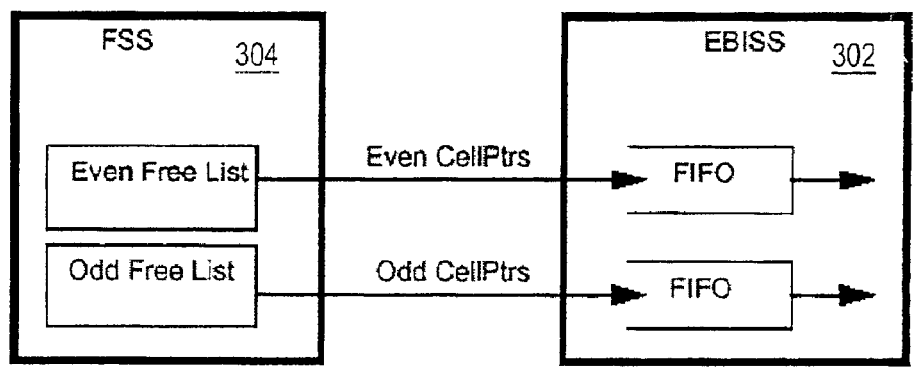
FIG. 4 illustrates the Egress Backplane Interface Subsystem (EBISS) as it is requesting Cell pointers from the FSS, in accordance with one embodiment of the present invention.

FIG. 4 illustrates the EBISS 112 as it is requesting Cell pointers from the FSS 102, in accordance with one embodiment of the present invention.

The FSS 102 maintains one free list of odd valued Cell pointers and one of even Cell pointers. Cell pointers are separated by parity (i.e., odd Cell pointers and even Cell pointers) to allow the EBISS 112 to refresh separate halves of the cell buffer dynamic RAMs. The null (zero) Cell-Pointer is not a member of any free list. The FSS 102 furnishes Cell pointers to the EBISS 112 over the Cell pointer interface in response to odd and even EBISS requests so long as the respective free list is not empty. The EBISS 112 stores odd and even Cell pointers in separate FIFOs until cells arrive. When a cell arrives the EBISS 112 writes the cell into the Cell Buffer at an address derived from the Cell pointer, and returns the write Cell pointer to the FSS 102 in synchronism with the corresponding CD. A maximum of twelve CDs and write Cell pointers are transferred from the EBISS 112 to the FSS 102 per MTS.

The FSS 102 passes four read Cell pointers with CDs per MTS to the EBISS 112 for cells to be transmitted from the Cell Buffer.

The FSS 102 stores each read Cell pointer for at least two MTSs before returning it to the Free List 214. The delay in returning the Cell pointer prevents the Cell pointer from being used again before the EBISS 112 reads the cell from the Cell Buffer, so that the cell is not corrupted. The EBISS 112 guarantees to read the cell from the Cell Buffer within two MTSs.

When no cells are to be read from the Cell Buffer the FSS 102 sets Cell pointer=0, ConnectionID=0, and CellType=NoData to indicate a null CD.

The EBISS 112 requests Cell pointers by specifying separate integer values not exceeding six each for even and odd Cell pointers. If the FSS 102 is unable to satisfy a request the FSS 102 transmits null Cell pointers. When a request is not fulfilled by the FSS 102 the EBISS 112 repeats the request during the following and subsequent MTSs until the request is fulfilled. The FSS 102 does not store requests.

The FSS 102 maintains separate counters of the number of free odd and even Cell pointers, available either in a cache or a Free List in external RAM. The FSS 102 transmits each of these values to the EBISS 112 each MTS so that the EBISS 112 is able to balance the usage of odd and even Cell pointers. The numbers of Cell pointers of each parity available in a free list or cache is made available to the CPU via SIFwire registers EvenFreeLen and OddFreeLen.

The EvenFree and OddFree counters indicate the number of free Cell pointers in the circular buffers—the remaining number of free even and odd Cell pointers, respectively. The counters are decremented each time a Cell pointer is obtained from a free list (1) whenever a Cell pointer is passed to the EBISS 112 in response to a request from the EBISS 112 and (2) whenever a Cell pointer is written into a CD inserted by the FSS 102 (multicast copy CDs, VS f-RM CDs, OAM CDs and other CDs requested by SIFwire). The counters are incremented each time a Cell pointer is returned to a free list (1) when the datapath is disabled from the QSS 110 and from the EBISS 112, (2) when swept by the QSS 110, (3) from read single cast and multicast copy CDs to the EBISS 112 including bypassing CDs, (4) from multicast original CDs after all copies have left the cell control path, (5) when the SAR or VD f-RM bypass buffers over-flow, and (6) when a multicast circular buffer overflows.

When the number of free Cell pointers which remain available in either the odd or even Free Lists and caches falls below a configurable threshold (e.g., BufFullTh) the FSS 102 sets either the odd or even 'Cell Buffer Nearly Full' (BNF) flags (or both) which are transmitted across the Cell pointer interface to the EBISS 112. The FSS 102 informs the CPU via the 'BUF_EAR_FULL' interrupt when the threshold is crossed for Cell pointers of either parity.

The Free Lists 214 need not be completely filled at initialization. The size of the subset of Cell-Pointers available for use is configurable by the CPU up to the maximum Cell pointer RAM size, in which case the whole Cell Buffer space would be available for cell storage. The parameter NumPtrs specifies the sizes of the even and odd Free Lists. The number of even and odd Cell pointers is always identical. The null Cell pointer (x0) is not used, and the highest valued odd Cell pointer is not used (x3FFFF for 256K or XFFFFF for 1M configuration).

An incoming CD which has CID=0 identifies a free cell timeslot. The corresponding 'write' Cell pointer is set to zero by the EBISS 112. Write Cell pointers which correspond to gaps are reused by the EBISS 112 for subsequent writes into the Cell Buffer.

The Free List RAM 214 contains the Remapping partition which remaps dummy Cell pointers to original Cell pointers for multicasting, and contains other multicast support data. The Remapping partition is the same size as and additional to the Free List 214—sufficient for 256K or 1M Cell pointers.

Internal Cell Pointer Caching

Potentially, 16 Cell pointers will be removed from the Free List 214 during each MTS. Potentially, 32 Cell pointers will be returned to the Free List 214 during each MTS.

Figure 5:
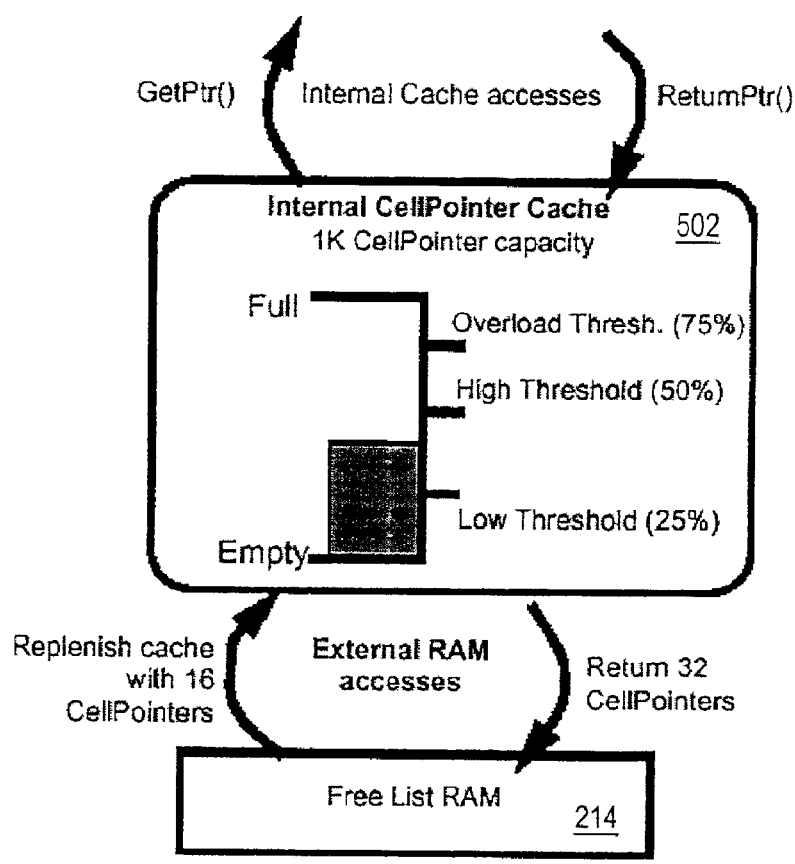
FIG. 5 is a schematic diagram showing cell pointer caching, in accordance with one embodiment of the present invention.

FIG. 5 is a schematic diagram showing Cell pointer Caching, in accordance with one embodiment of the present invention. Internal Cell pointer caches 502 are used to store Cell pointers temporarily internally to the Filter Subsystem ASIC 102 to avoid performing 16 reads and 32 writes to external RAM within the same MTS. The caches allow Cell pointers, which have been returned, to be reused relatively soon afterwards without being written to and read from external Pointer RAM. The frequency of RAM accesses is thus reduced, and RAM accesses are decoupled from instantaneous Cell pointer requirements.

Two caches of the form shown in FIG. 5 are provided in the FSS 102. One cache contains even valued Cell pointers, the other odd. 1K Cell pointer spaces are provided in each cache. Hard-wired thresholds determine when the cache 502 is to be replenished or emptied. Each cache 502 is prefilled to the 50% threshold during initialization. When the cache fill exceeds the 50% threshold (511), a block of Cell pointers is written in a burst to the Free List RAM 214. When the number of Cell pointers in a cache 502 falls below the 25% threshold (256) a block of Cell pointers is read in a burst from the Free List RAM 214. A maximum of two bursts is provided during each MTS. Each burst may either obtain or return Cell pointers from or to either the Odd or Even Free Lists held in external Free List RAM 214. The transfer of Cell pointers from external Free List RAM 214 to the cache 502 occurs in two bursts of 8 Cell pointers each, to meet the maximum average demand of 16 Cell pointers which may occur each MTS. The transfer of Cell pointers from the cache 502 to the external Free List RAM 214 occurs in two bursts of 16, to meet the maximum possible average rate of return of Cell pointers to the caches 502.

Cell pointers from external Free List RAM 214 are not used if the configured number of Cell pointers (NUMPTRS) is less than or equal to 1022.

While both the odd and even caches exceed the high thresholds, 16 Cell pointers are returned from each. While both are depleted below the low thresholds, 8 Cell pointers are obtained for each if possible (if the Free List RAM 214 is not empty).

Interrupts are issued to the CPU whenever a Free List 214 is empty. The 'NO_OPTRS' interrupt is generated while no free odd Cell pointers are available, and the 'NO_EPTRS' interrupt is generated while no free even Cell pointers are available.

Interrupts are also generated whenever an attempt is made to return a Cell pointer to a Free List 214 which is full. The 'OFL_OFLOW' and 'EFL_OFLOW' interrupts are asserted for the odd and even free lists, respectively.

Potential Cache Instability

The table below illustrates a potentially unstable situation which is described below with its prevention mechanism. It is possible that other unstable conditions may exist.

TABLE 1

Example of Potential Cache Instability

| MTS | Odd Cache Fill | Addn To Odd Cache | To EBISS | Odd FL RAM | Even Cache Fill | To EBISS | Even FL RAM |
|---|---|---|---|---|---|---|---|
| N | 512 | 32 | 0 | Wr16 | 255 | 6 | Rd8 |
| n + 1 | 528 | 32 | 0 | Wr32 | 257 | 6 | — |
| n + 2 | 528 | 32 | 0 | Wr16 | 251 | 6 | Rd8 |
| n + 3 | 544 | 32 | 0 | Wr16 | 253 | 6 | Rd8 |
| n + 4 | 560 | 32 | 0 | Wr16 | 255 | 6 | Rd8 |
| n + 5 | 576 | 32 | 0 | Wr32 | 257 | 6 | — |
| n + 6 | 576 | 32 | 0 | Wr16 | 251 | 6 | Rd8 |
| n + 7 | 592 | 32 | 0 | Wr16 | 253 | 6 | Rd8 |
| ... | ... | ... | ... | ... | ... | ... | ... |

Access to the even Free List to replenish the even cache may prevent the return of Cell pointers to the odd Free List from the odd cache while the odd cache is suffering an inundation of odd Cell pointers. Although the EBISS 112 attempts to balance usage of Cell pointers, the EBISS 112 is not able to balance usage of the caches. Any balancing applies across the whole Cell pointer space. It is possible that Cell pointers of one type (e.g., odd as shown in the table above) may be returned to the cache at the maximum rate of 32 per MTS which may be sustained over multiple successive MTSs. While the even cache remains between the thresholds, the 32 odd Cell pointers per MTS may be returned to the odd Free List 214. However, if the even cache becomes depleted, and if the EBISS 112 continues to request even Cell pointers at the maximum rate of 6 per MTS, reads from the even Free List will be required. These reads prevent the return of odd Cell pointers to the Free List at the maximum rate of 32 per MTS. The odd cache fill would tend to grow without bound. In order to prevent the permanent loss of Cell-Pointers (i.e., a memory leak) should the cache overflow, an overload threshold is employed above which cache replenishments are prevented. This overload threshold is discussed above with reference to FIG. 5. The overload threshold allows a higher fill than the high threshold.

When either cache fill exceeds the 75% threshold (767) the other cache is not replenished from the external Free List RAM 214. The replenishment of a particular cache would be suspended until the cache fill of the other type falls below that 75% threshold. Ultimately, it is thus possible but unlikely that the provision of Cell pointers of a particular type (even Cell pointers in the example above) to the EBISS 112 may be suspended after the cache 504 becomes completely empty. Provision of Cell pointers of the other type to the EBISS 112, however, would not be interrupted. The table below illustrates how the 75% threshold provides stability to the inundated cache at the expense of the depleting cache.

TABLE 2

Example of Precedence of Cell pointer Return Over Acquisition

| MTS | Odd Cache Fill | Addn To Odd Cache | To EBISS | Odd FL RAM | Even Cache Fill | To EBISS | Even FL RAM |
|---|---|---|---|---|---|---|---|
| n | 768 | 32 | 0 | Wr32 | 255 | 6 | — |
| n + 1 | 768 | 32 | 0 | Wr32 | 249 | 6 | — |
| n + 2 | 768 | 32 | 0 | Wr32 | 243 | 6 | — |
| n + 3 | 768 | 32 | 0 | Wr32 | 237 | 6 | — |
| n + 4 | 768 | 32 | 0 | Wr32 | 231 | 6 | — |
| n + 5 | 768 | 32 | 0 | Wr32 | 225 | 6 | — |
| n + 6 | 768 | 32 | 0 | Wr32 | 219 | 6 | — |
| n + 7 | 768 | 32 | 0 | Wr32 | 213 | 6 | — |
| ... | ... | ... | ... | ... | ... | ... | ... |

TABLE 3

Examples of Free List and Cache Management Functions

```
function GetEvenPtr()
    CellPtr := EvenCacheRdAddr;
    EvenCacheRdAddr + 1;
    EvenCacheFill - 1;
    if (EvenCacheFill = LOW)
        --Get some more pointers from Free List
        count := BurstSize;
        while (count > 0) LOOP
            ReadEvenPtr();
            count - 1;
        end LOOP
    end if
end GetEVenPtr()
function GetOddPtr()
    CellPtr := OddCacheRdAddr;
    OddCacheRdAddr + 1;
    OddCacheFill - 1;
    if (OddCacheFill = LOW)
        --Get some more pointers from Free List
        count := BurstSize;
        while (count > 0) LOOP
            ReadOddPtr();
            count - 1;
        end LOOP
    end if
end GetOddPtr()
function ReturnPtr()
    if (CellPtr = even)
        WriteEvenPtr();
        BufFillEven - 1;
    else
        WriteOddPtr();
        BufFillOdd - 1;
    end if;
end ReturnPtr()
```

It should be noted that neither read nor write Central Processing Unit (CPU) access is provided to Pointer RAM. Cell pointers are written into the Pointer RAM by the FSS 102 during initialization, in accordance with parameters configured by the CPU.

System And Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMS, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, storing free cell pointers into a free cell pointer random access memory (RAM), temporarily storing at least one free cell pointer into internal cache configured to assist in lowering a frequency of reads from and writes to the free cell pointer RAM, receiving a request from an external integrated circuit for free cell pointers, sending free memory cell pointers to queues of the external integrated circuit, receiving at least one write cell pointer and a corresponding cell descriptor from the external integrated circuit, and calculating free counter values in order to keep track of the free cell pointers, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of caching free cell pointers pointing to memory buffers configured to store data traffic of network connections, the method comprising:
   storing free cell pointers into a pointer random access memory (RAM), wherein each free cell pointer points to a memory buffer that is vacant and available for storing data traffic;
   temporarily storing at least one free cell pointer from the pointer RAM into internal cache configured to assist in lowering a frequency of reads from and writes to the pointer RAM;
   receiving a request from an external integrated circuit for one or more free cell pointers;
   sending one or more free cell pointers to one or more queues of the external integrated circuit, the one or more free cell pointers including the at least one free cell pointer temporarily stored in the internal cache, wherein each free cell pointer in the one or more free cell pointers in the one or more queues is configured to become a write cell pointer;
   receiving at least one write cell pointer and a corresponding cell descriptor from external integrated circuit; and
   calculating free cell pointer counter values in order to keep track of the free cell pointers.

2. The method of claim 1, wherein the pointer random access memory (RAM) is external to controller circuitry configured to control the steps of the method.

3. The method of claim 1, wherein the external integrated circuit is an egress backplane interface subsystem (EBISS), and the queues of the external integrated circuit are first in, first out (FIFO) queues.

4. The method of claim 1, further comprising sending read cell pointers with corresponding cell descriptors to the external integrated circuit, wherein each read cell pointer points to a memory buffer that has been read and that is free to be reused.

5. The method of claim 1, wherein the step of storing free cell pointers comprises:
   storing odd free cell pointers in an odd free list of the pointer RAM; and
   storing even free cell pointers in an even free list of the pointer RAM.

6. The method of claim 1, wherein the step of temporarily storing free cell pointers comprises:
   storing odd free cell pointers in an odd free space of internal cache; and
   storing even free cell pointers in an even free space of internal cache.

7. The method of claim 4, wherein the step of calculating free counter values comprises performing at least one of:
   incrementing a free counter value to account for a cell pointer that has been sent to the pointer RAM; and
   decrementing a free counter value to account for a cell pointer that has been received from the pointer RAM.

8. The method of claim 1, wherein the step of calculating free counter values comprises determining that a free counter value of internal cache is above a high threshold, and wherein the method further comprises writing a block of cell pointers in a burst to the pointer RAM.

9. The method of claim 1, wherein the step of calculating free counter values comprises determining that a free counter value of internal cache is below a low threshold, and wherein the method further comprises reading a block of free cell pointers in a burst from the pointer RAM.

10. The method of claim 1, wherein the step of calculating free counter values comprises determining that a free counter value of internal cache is above an overload threshold, and wherein the method further comprises temporarily blocking storing of additional free cell pointers into internal cache.

11. An integrated circuit configured to cache free cell pointers pointing to memory buffers configured to store data traffic of network connections, the integrated circuit comprising:
   controller circuitry configured to control operations of:
   storing free cell pointers into a pointer random access memory (RAM), wherein each free cell pointer points to a memory buffer that is vacant and available for storing data traffic;
   temporarily storing at least one free cell pointer from the pointer RAM into internal cache configured to assist in lowering a frequency of reads from and writes to the pointer RAM;
   receiving a request from an external integrated circuit for free cell pointers;

sending one or more free cell pointers to one or more queues of the external integrated circuit, wherein the one or more free cell pointers comprise the at least one free cell pointer temporarily stored in the internal cache, wherein each free cell pointer in the one or more free cell pointers in the one or more queues configured to become a write cell pointer;

receiving at least one write cell pointer and a corresponding cell descriptor from the external integrated circuit; and calculating free cell pointer counter values in order to keep track of the free cell pointers.

12. The integrated circuit of claim 11, wherein the pointer random access memory (RAM) is external to controller circuitry.

13. The integrated circuit of claim 11, wherein the external integrated circuit is an egress backplane interface subsystem (EBISS), and the queues of the external integrated circuit are first in, first out (FIFO) queues.

14. The integrated circuit of claim 11, wherein the controller circuitry is further configured to control operation of sending read cell pointers with corresponding cell descriptors to the external integrated circuit, wherein each read cell pointer points to a memory buffer that has been read and that is free to be reused.

15. The integrated circuit of claim 11, wherein the operation of storing free cell pointers further configures the controller circuitry to control operations of:

storing odd free cell pointers in an odd free list of the pointer RAM; and storing even free cell pointers in an even free list of the pointer RAM.

16. The integrated circuit of claim 11, wherein the operation of temporarily storing free cell pointers further configures the controller circuitry to control operations of:

storing odd free cell pointers in an odd free space of internal cache; and storing even free cell pointers in an even free space of internal cache.

17. The integrated circuit of claim 14, wherein the operation of calculating free cell pointer counter values further configures the controller circuitry to control operation of performing at least one of:

incrementing a free counter value to account for a cell pointer that has been sent to the pointer RAM; and decrementing a free counter value to account for a cell pointer that has been received from the pointer RAM.

18. The integrated circuit of claim 11, wherein the operation of calculating free counter values further configures the controller circuitry to control operations of:

determining that a free cell pointer counter value of the internal cache is above a high threshold; and writing a block of cell pointers in a burst to the pointer RAM.

19. The integrated circuit of claim 11, wherein the operation of calculating free counter values further configures the controller circuitry to control operations of:

determining that a free counter value of the internal cache is below a low threshold; and reading a block of free cell pointers in a burst from the pointer RAM.

20. The integrated circuit of claim 11, wherein the operation of calculating free cell pointer counter values further configures the controller circuitry to control operations of:

determining that a free counter value of internal cache is above an overload threshold; and temporarily blocking storing of additional free cell pointers into internal cache.

21. A computer-readable medium carrying one or more sequences of one or more instructions for caching free cell pointers pointing to memory buffers configured to store data traffic of network connections, the one or more sequences of one or more instructions including instructions which, when executed by one or more processors, cause the one or more processors to perform steps of:

storing free cell pointers into a pointer random access memory (RAM), wherein each free cell pointer points to a memory buffer that is vacant and available for storing data traffic;

temporarily storing at least one free cell pointer from the pointer RAM into internal cache configured to assist in lowering a frequency of reads from and writes to the pointer RAM;

receiving a request from an external integrated circuit for free cell pointers;

sending one or more free cell pointers to one or more queues of the external integrated circuit, wherein the one or more free cell pointers comprise the at least one free cell pointer temporarily stored in the internal cache, wherein each free cell pointer in the one or more free cell pointers in the one or more queues is configured to become a write cell pointer;

receiving at least one write cell pointer and a corresponding cell descriptor from the external integrated circuit; and calculating free counter values in order to keep track of the free cell pointers.

22. The computer-readable medium of claim 21, wherein the pointer random access memory (RAM) is external to controller circuitry configured to control operations of the computer-readable medium.

23. The computer-readable medium of claim 21, wherein the external integrated circuit is an egress backplane interface subsystem (EBISS), and the queues of the external integrated circuit are first in, first out (FIFO) queues.

24. The computer-readable medium of claim 21, wherein the instructions further cause the processor to perform a step of sending read cell pointers with corresponding cell descriptors to the external integrated circuit, wherein each read cell pointer points to a memory buffer that has been read and that is free to be reused.

25. The computer-readable medium of claim 21, wherein the step of storing free cell pointers further causes the processor to carry out steps of:

storing odd free cell pointers in an odd free list of the pointer RAM; and storing even free cell pointers in an even free list of the pointer RAM.

26. The computer-readable medium of claim 21, wherein the step of temporarily storing free cell pointers further causes the processor to carry out steps of:

storing odd free cell pointers in an odd free space of internal cache; and storing even free cell pointers in an even free space of internal cache.

27. The computer-readable medium of claim 24, wherein the step of calculating free cell pointer counter values further causes the processor to carry out at least one of:

incrementing a free cell pointer counter value to account for a cell pointer that has been sent to the pointer RAM; and decrementing a free counter value to account for a cell pointer that has been received from the pointer RAM.

28. The computer-readable medium of claim 21, wherein the step of calculating free counter values further causes the processor to carry a step of determining that a free counter value of the internal cache is above a high threshold, and wherein the instructions further configure the processor to perform a step of writing a block of cell pointers in a burst to the free pointer RAM.

29. The computer-readable medium of claim 21, wherein the step of calculating free counter values further causes the processor to carry out a step of determining that a free counter value of the internal cache is below a low threshold, and wherein the instructions further cause the processor to perform a step of reading a block of free cell pointers in a burst from the pointer RAM.

30. The computer-readable medium of claim 21, wherein the step of calculating free counter values further causes the processor to carry a step of determining that a free counter value of internal cache is above an overload threshold, and wherein the instructions further cause the processor to perform a step of temporarily blocking storing of additional free cell pointers into internal cache.

31. A method for storing data traffic of network connections, the method comprising:
   storing free cell pointers into a pointer random access memory (RAM), wherein each free cell pointer points to a memory location that is vacant and available for storing data traffic;
   temporarily storing at least one free cell pointer from the pointer RAM into internal cache;
   receiving a request from an integrated circuit for one or more free cell pointers; and
   sending one or more free cell pointers to the integrated circuit, the one or more free cell pointers including the at least one free cell pointer temporarily stored in the internal cache, wherein each free cell pointer in the one or more free cell pointers is used to write data traffic to a memory location associated with each free cell pointer.

32. The method of claim 31, wherein the RAM is external to the integrated circuit.

33. The method of claim 31, further comprising returning free cell pointers to the internal cache after data traffic has been written to memory locations associated with the free cell pointers.

34. The method of claim 31, further comprising:
   determining a cell including data traffic;
   determining a free cell pointer; and
   writing the data traffic to a memory location associated with the free cell pointer.

35. The method of claim 31, wherein the one or more free cell pointers are stored in one or more queues in the integrated circuit.

36. The method of claim 31, wherein the cache is configured to assist in lowering a frequency of reads from and writes to the pointer RAM.

37. A system for storing data traffic of network connections, the system comprising:
   a storage device comprising:
      a pointer random access memory (RAM) configured to store free cell pointers, wherein each free cell pointer points to a memory location that is vacant and available for storing data traffic;
      a internal cache configured to temporarily store at least one free cell pointer from the pointer RAM;
   an integrated circuit configured to store data traffic, the integrated circuit configured to request one or more free cell pointers from the storage device and store data traffic in memory locations,
   wherein one or more free cell pointers from the storage device are sent to the integrated circuit in response to the request, the one or more free cell pointers including the at least one free cell pointer temporarily stored in the internal cache, wherein each of the one or more free cell pointers is used to write data traffic to a memory location associated with each free cell pointer.

38. The system of claim 37, wherein the storage device is external storage with respect to the integrated circuit.

39. The system of claim 37, wherein the integrate circuit comprises one or more queues configured to store the one or more free cell pointers.

40. The system of claim 37, wherein the internal cache is configured to assist in lowering a frequency of reads from and writes to the pointer RAM.

\* \* \* \* \*